(12) United States Patent
Waheed

(10) Patent No.: US 8,750,167 B2
(45) Date of Patent: Jun. 10, 2014

(54) TRANSMIT POWER CONTROL TECHNIQUES FOR NODES IN AN AD-HOC NETWORK

(75) Inventor: Khurram Waheed, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 292 days.

(21) Appl. No.: 13/284,253

(22) Filed: Oct. 28, 2011

(65) Prior Publication Data

US 2013/0107758 A1    May 2, 2013

(51) Int. Cl.
    *H04L 12/28* (2006.01)
(52) U.S. Cl.
    USPC .......................................... 370/255; 370/338
(58) Field of Classification Search
    None
    See application file for complete search history.

(56) References Cited

U.S. PATENT DOCUMENTS

| | | | |
|---|---|---|---|
| 6,735,448 B1 * | 5/2004 | Krishnamurthy et al. .... | 455/522 |
| 7,778,218 B2 | 8/2010 | Holma | |
| 7,787,849 B2 | 8/2010 | Rofougaran | |
| 7,797,083 B1 | 9/2010 | Brumett, Jr. | |
| 7,885,244 B2 * | 2/2011 | Bhatti et al. ................... | 370/338 |
| 8,451,807 B2 * | 5/2013 | Yi et al. ......................... | 370/338 |
| 2006/0251098 A1 * | 11/2006 | Morioka ........................ | 370/432 |
| 2010/0248736 A1 | 9/2010 | Hulkkonen | |
| 2010/0248737 A1 | 9/2010 | Smith | |

OTHER PUBLICATIONS

C. J. Colbourn et al., "A carrier sense multiple access protocol with power backoff (CSMA/PB)," Ad Hoc Networks, vol. 5, No. 8, pp. 1233-1250, 2007.
Park et al., "Coordinating the Interplay between Physical Carrier Sense and Power Control in CSMA/CA Wireless Networks," 2007. (http://www.ideals.illinois.edu/handle/2142/11374), pp. 1-9.

* cited by examiner

*Primary Examiner* — Robert Wilson
(74) *Attorney, Agent, or Firm* — Yudell Isidore Ng Russell PLLC

(57) ABSTRACT

A technique for controlling transmit power of nodes in an ad-hoc network includes receiving, by a receiver of a leaf node included in the nodes of the ad-hoc network, a signal from a coordinator node included in the nodes of the ad-hoc network. The leaf node sets a transmit power of a transmitter of the leaf node based on a level of the signal and a desired minimum sensitivity for the receiver.

10 Claims, 4 Drawing Sheets

TRANSMIT POWER CONTROL TECHNIQUES FOR NODES IN AN AD-HOC NETWORK

BACKGROUND

1. Field

This disclosure relates generally to power control and, more specifically, transmit power control techniques for nodes in an ad-hoc network.

2. Related Art

An ad-hoc network is a decentralized type of network that does not rely on a pre-existing infrastructure. In general, each node in a wireless ad-hoc network may forward data for other nodes. The decentralized nature of wireless ad-hoc networks makes ad-hoc networks suitable for a variety of applications, e.g., applications where a dedicated implementation of a fixed management node is not desirable. Implementation of dynamic and adaptive routing protocols enable ad-hoc networks to be formed relatively quickly. Wireless ad-hoc networks may take various forms, e.g., a mobile ad-hoc network (MANET), a wireless mesh network (WMN), and a wireless sensor network (WSN).

In general, a wireless ad-hoc network is made up of multiple nodes that are connected by wireless links. As wireless links can be established at any time, wireless ad-hoc networks are usually designed for dynamic restructuring in a manner that is timely, efficient, reliable, robust, and scalable. Typically, nodes of a wireless ad-hoc network compete for access to a shared frequency spectrum, which can result in collisions (interference) between communications of the nodes.

Carrier sense multiple access (CSMA) is a probabilistic media access control (MAC) protocol in which a node verifies the absence of other traffic before transmitting on a shared transmission medium, such as a band of the electromagnetic spectrum. Carrier sense means that each node attempts to detect the presence of an encoded signal (transmitted from another node) before attempting to transmit. If a carrier is sensed, a node waits for a transmission to finish before initiating its own transmission. Multiple access means that multiple nodes send and receive signals on the same channel. CSMA with collision detection (CSMA/CD) is a modification of CSMA that attempts to improve CSMA performance by terminating transmission as soon as a collision is detected, while reducing the probability of a second collision on a transmission retry. CSMA with collision avoidance (CSMA/CA) is another modification of CSMA. CSMA/CA attempts to improve the performance of CSMA by attempting to be less greedy on a channel. For example, in systems employing CSMA/CA, if a channel is sensed by a node as being busy before a transmission, the transmission is deferred for a random interval to reduce the probability of collisions on the channel.

The IEEE 802.15.4-2006 standard (which has been maintained by the IEEE 802.15 working group) specifies a physical layer and MAC layer for low-rate wireless personal area networks (PANs). The IEEE 802.15.4-2006 standard provides the basis for the ZigBee™, wireless highway addressable remote transducer (WirelessHART™), and MiWi™ specifications. Currently, the IEEE 802.15 working group is working on a number of next generation standards focused on applications in industrial, radio frequency identification (RFID), smart utility networks (SUN), critical infrastructure management, and body area networks.

The IEEE 802.15.4-2006 standard defines two types of network nodes, i.e., a full-function device (FFD) and a reduced-function device (RFD). An FFD can serve as a coordinator node of a network or as a common node. An FFD implements a general model of communication that allows the FFD to talk to any other device. An FFD may relay messages, in which case the FFD is designated as a coordinator node (or a network coordinator node when the FFD is in charge of the entire network). In general, RFDs are relatively simple devices with relatively low resource and communication requirements and, as such, usually only communicate with FFDs and never act as coordinator nodes. When a PAN takes the form of a peer-to-peer network, arbitrary patterns of connections may be achieved, limited only by the distance between each pair of nodes.

IEEE 802.15.4 g smart utility network (SUN) task group is operative under the umbrella of the IEEE 802.15 working group and is chartered to create a physical (PHY) amendment to IEEE 802.15.4 to provide a global standard that facilitates very-large scale process control applications, such as a smart-grid utility network capable of supporting large, geographically diverse networks with minimal infrastructure (with potentially millions of fixed endpoints).

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
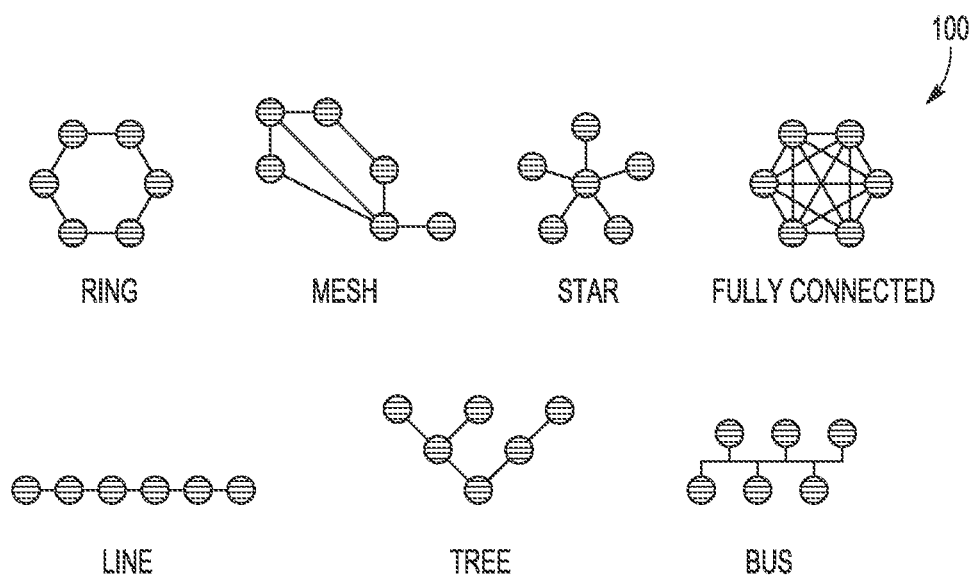
FIG. 1 is a diagram depicting various network topologies that may be implemented by an ad-hoc network configured according to an embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' includes a direct electrical connection between elements or components and an indirect electrical connection between elements or components achieved using one or more intervening elements or components.

According to one aspect of the present disclosure, a technique for controlling transmit power of nodes in an ad-hoc network includes receiving, by a receiver of a leaf node included in the nodes of the ad-hoc network, a signal from a coordinator node included in the nodes of the ad-hoc network. The leaf node sets a transmit power of a transmitter of the leaf node based on a level of the signal and a desired minimum sensitivity for the receiver. While the discussion herein focuses on implementing transmit power control techniques in a leaf node of an ad-hoc network, it should be appreciated that the disclosed transmit power control techniques are not limited to leaf nodes. For example, the disclosed transmit power control techniques may be implemented in peer-to-peer networks and in machine-to-machine communications.

Wireless ad-hoc networks configured according to aspects of the present disclosure may take various forms. For example, with reference to FIG. 1, nodes of a wireless ad-hoc network 100 configured according to the present disclosure may form: a ring network; a mesh network; a star network; a line network; a tree network; a bus network; or a fully-connected network, among other network configurations. In general, modern non-cellular star/mesh wireless ad-hoc networks may be implemented in both regulated and unregulated industrial, scientific, and medical radio bands including the shared industrial, scientific, and medical (ISM) radio bands. In most wireless ad-hoc networks, spectrum allocation is locally managed by a central coordinating device for each individual network. For example, with reference to FIG. 2, a wireless ad-hoc network 200 (that is formed as a star network) is depicted that includes a coordinator node 202 that is in communication with a number of associated leaf nodes 204. As is shown in FIG. 2, a joining leaf node 206 is attempting to join network 200 by communicating with coordinator node 202. It should be appreciated that multiple wireless ad-hoc networks may overlap and/or co-exist spatially.

In general, ad-hoc networks may include multiple (e.g., 3-250) nodes (peripheral devices or leaf nodes) that communicate with a coordinator node in a time-division duplex (TDD) fashion using the same frequency spectrum. Unfortunately, if all of the peripheral devices in a wireless ad-hoc network transmit signals at a maximum allowable power, generated interference may desensitize receivers in at least some of the peripheral devices. As transmitted power for a power efficient wireless node substantially determines power consumption of the wireless node, good regulation of transmitted power from the wireless node reduces power consumption and increases efficient use of available energy. As should be appreciated, for battery powered devices, reducing power consumption increases battery life.

Figure 3:
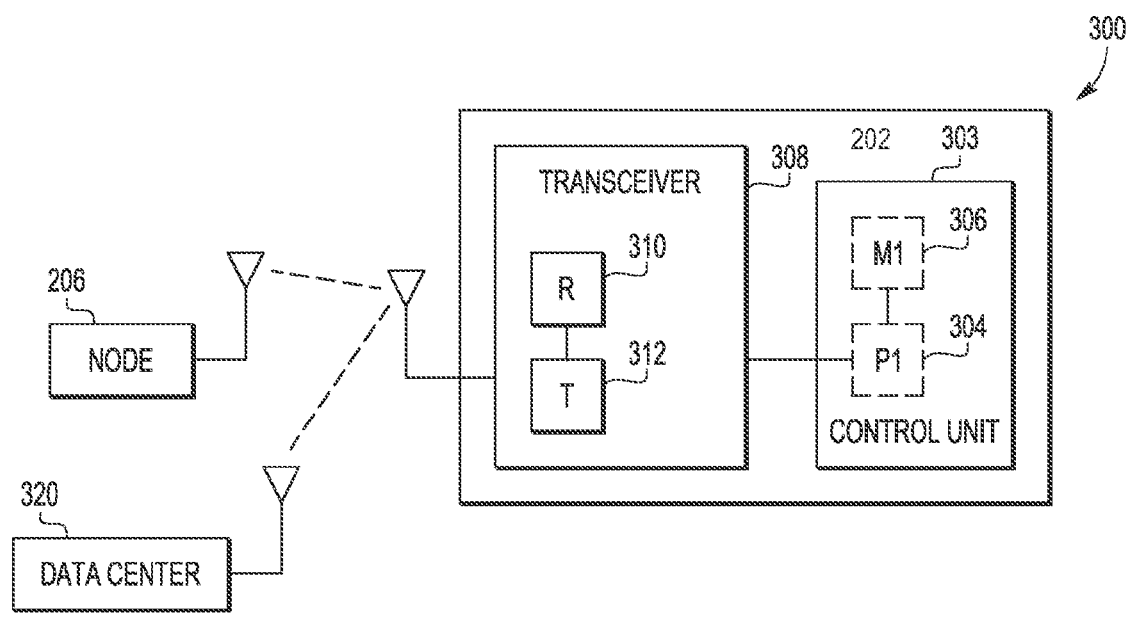
FIG. 3 is a diagram of a relevant portion of an ad-hoc network configured according to an embodiment of the present invention.

With reference to FIG. 3, a relevant portion of an example wireless ad-hoc network 300 is illustrated with a single coordinator node 202 that is communicating with joining leaf node 206. Coordinator node 202 is also in communication with a data center 320, which may, for example, include one or more storage area networks (SANs). As is illustrated, coordinator node 202 includes a transceiver 308 (which includes a receiver (R) 310 and a transmitter (T) 312). Transceiver 308 is communication with a control unit 303, which is illustrated as including a processor (P1) 304 coupled to memory subsystem (M1) 306. It should be appreciated that control unit 303 may take various other forms, e.g. an application specific integrated circuit (ASIC) or a programmable logic device (PLD). When implemented, processor 304 includes one or more processor cores and memory subsystem 306 includes an application appropriate amount of volatile and/or non-volatile memory. For example, the memory subsystem 306 may include: dynamic random access memory (DRAM); static random access memory (SRAM); read-only memory (ROM); flash memory; and/or memory cards. In one or more embodiments, joining leaf node 206 and associated leaf nodes 204 are configured similar to coordinator node 202. That is, leaf node 206 and associated leaf nodes 204 each include a transceiver and a control unit (not separately shown).

Coordinator node 202 may, for example, be configured to forward information received from leaf node 206 to data center 320 for processing. For example, leaf node 206 may correspond to a device that periodically reports a meter reading of a utility (e.g., gas, water, and electric) for a consumer to coordinator node 202, which reports the meter reading to data center 320 (which is responsible for measuring consumption of the utility by the consumer and billing the consumer). As another example, leaf node 206 may correspond to a medical sensor that functions as a blood pressure sensor, a foot pressure sensor, a knee angle sensor, etc. Coordinator node 202 may, for example, correspond to another device that periodically reports a meter reading of another utility to data center 320 or may be a dedicated device whose sole function is to forward information received from leaf nodes 204 and 206 to data center 320. Alternatively, coordinator node 202 may communicate with data center 320 via a wired communication link (not shown).

According to various embodiments, each node joining an ad-hoc network (including those already associated with the network) adjust their transmit power level for transmission to another node based on the level of a received signal from that particular node (e.g., a "beacon" signal from a coordinator node). That is, the relationship is given by:

$$P_{Tx} = f(P_{Rx})$$

where $P_{Tx}$ is the set power level for the transmitting node, $P_{Rx}$ is the received power level of the received message (e.g., a coordinator message or its beacon), and f(•) is a function defined based on network topology, frequency band, and/or local regulatory requirements in a region.

In general, a node in an ad-hoc network chooses a transmit power level when sending out a message (or packet) based on a received signal level from another node. The equation above defines an abstract function as there are several possible scenarios due to the structure of a received signal, network topology, frequency band, and/or local regulatory requirements. For example, a received signal may be interpreted in whole or only in part. For example, in its simplest form a complete received signal energy may be used as a metric to determine the transmit signal power $P_{Tx}$. If the received signal has a structure that includes a preamble (or a section that provides information for channel estimation), a header (a signal section which describes the rest of the packet format, modulation and structure, such as start/stop bits, padding, payload size, etc.) and the useful part of the packet (e.g., data as defined by the header), transmit power may be determined based on channel estimate information or another specific message sub-field.

If a received signal provides a good channel estimate (as a function of frequency and time), the same information may be used to temporally adjust the transmit signal power across the transmit spectrum accordingly. For example, it is relatively straightforward to adjust the power of an orthogonal frequency-division multiplexing (OFDM) signal in various frequency sub-bands of a transmitted signal based on a received signal estimate. When channel estimates are refreshed with each reception, a dynamic transmit power control mechanism may be employed. The interpretation of a received signal may also be a function of the network topology and the role of a particular node. For example, FIG. 2 defines a relatively simple example of a star-connected network topology where each existing node 204, as well as a new joining node 206, are all in direct communication with a coordinator node 202.

Figure 2:
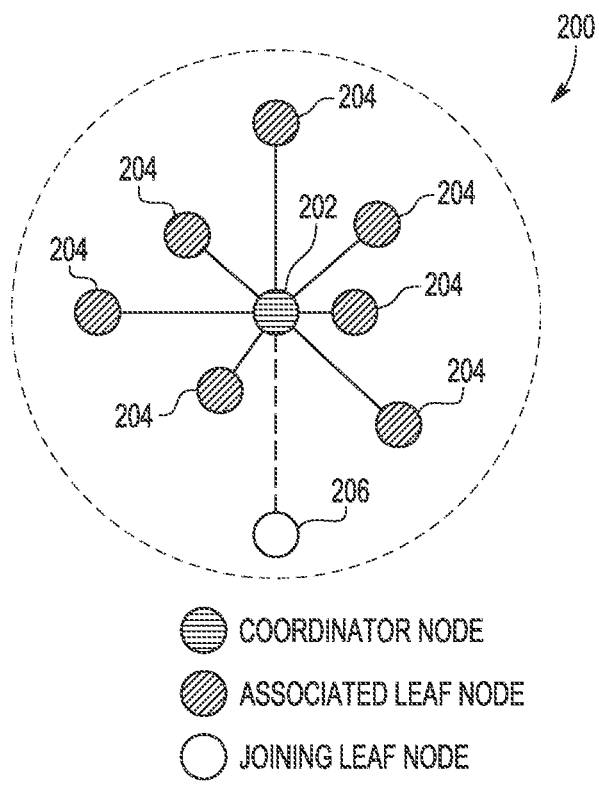
FIG. 2 is a diagram of a relevant portion of an ad-hoc network that implements a star topology and whose leaf nodes are configured according to an embodiment of the present invention.

As is illustrated in FIG. 1, ad-hoc networks may take various forms, such as a ring or a mesh, or may be a hybrid connected network. As used herein, a hybrid connected network is a combination of simple network topologies such as ring, star, and mesh and may by either fully or partially connected with active connections that may change over time. A network topology of an ad-hoc network may include a coordinator node that connects to end nodes using an intermediate node that acts as a router, a repeater, or a sub-net. In such a network, an end node may receive messages from a coordinator node, as well as a local router. Similarly, an end node may communicate only with a local router or the end node may also communicate with a network coordinator node, as allowed by a network management layer.

For more complex network topologies, a node in an ad-hoc network may need to communicate with more than one node in the network. In this case, it may be more efficient if a transmitting device adjusts transmit power independently for each device that the transmitting device communicates. It should be appreciated that an algorithm for estimation of transmit power (to each communicating node) may be defined independently based on specific link properties. For example, in a two layer network a transmission to a local router may be more predictable, while communication with a network coordinator node may have to account for a higher probability of collision with other transmissions, a higher transmit distance, etc.

It should be appreciated that a frequency band used for transmission may have a relatively large impact on available link budget and a network size. For example, in the U.S., the federal communications commission (FCC) defines the maximum allowable transmit power in a frequency band. To complicate things further, a maximum allowable transmit frequency may be a function of a transmitted signal bandwidth and linearity requirements, etc., for the transmitted signal. For example, North America (NA) 902-928 MHz, narrow band constant envelope communication is allowed to transmit root mean square (RMS) power up to 30 dBm. When an OFDM or a spread spectrum signal is transmitted in the same band, RMS power may need to be backed off as a function of the peak-to-average power ratio of the signal so that the signal peak does not violate the 30 dBm maximum signal requirement. Depending on the modulation parameters, an RMS transmit signal back-off may be as high as 10-12 dB.

Moreover, it should be appreciated that when a transmitting device needs to frequency hop different RMS transmit signal back-offs may be required for different frequency sub-bands. As one example, for a frequency band around 400 MHz a maximum allowable transmit power is limited to 0-10 dBm in NA. An effective radius of influence of a node (or the distance up to which a network node can communicate) is generally determined by a maximum allowed transmission power (which is a function of location and regulation), a topology of the terrain (including contouring, direct/indirect line of sight, etc.), ambient characteristics (e.g., average absorption/decay of the transmitted signal per unit distance), a duty cycle of transmission (e.g., how soon does the node communicate, spectrum sharing), as well as quality of the receiver (such as sensitivity, which defines the minimum power of the received signal).

Figure 5:
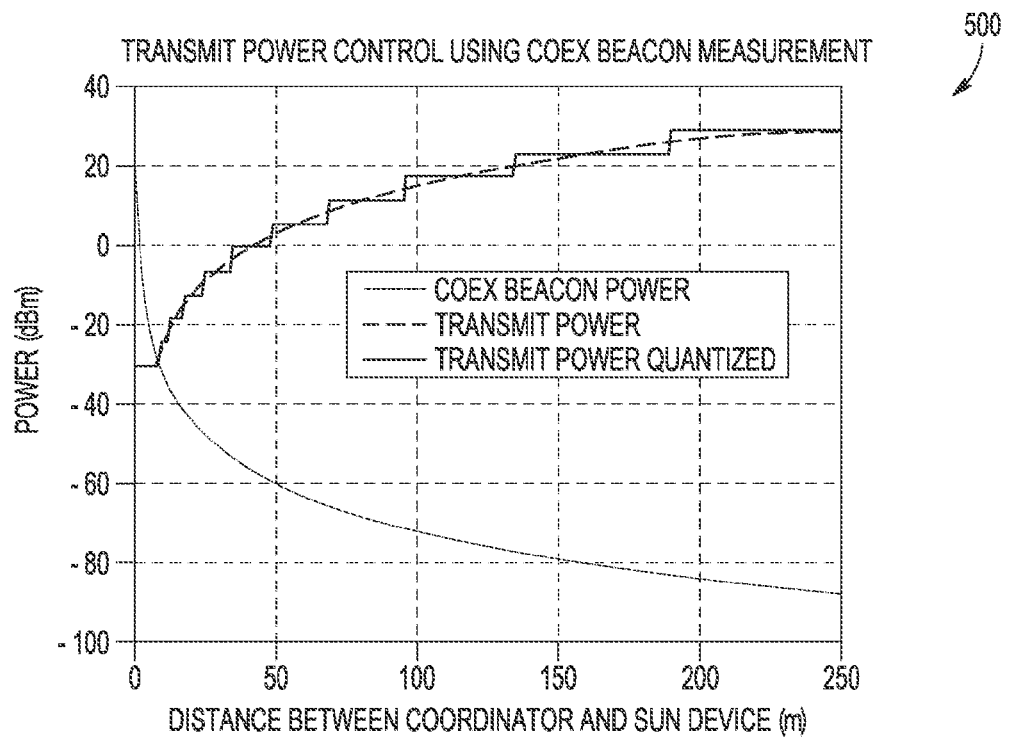
FIG. 5 is a graph depicting beacon signal power as a function of a distance between a coordinator node and a leaf node of an ad-hoc network configured according to another embodiment of the present invention.
Figure 6:
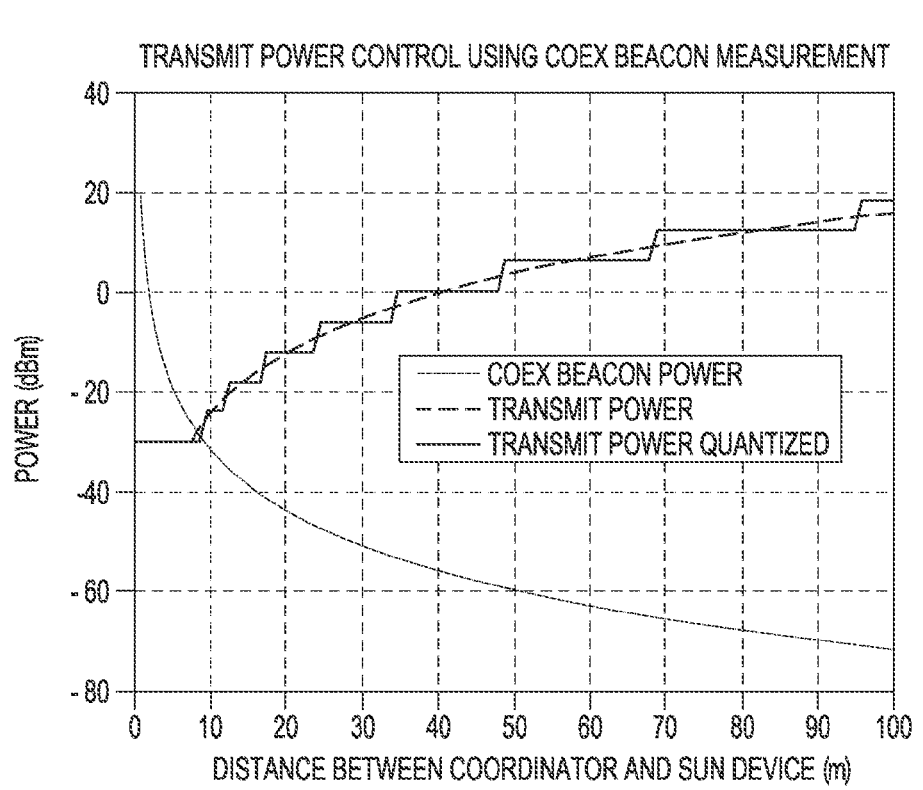
FIG. 6 is a graph depicting beacon signal power as a function of a distance between a coordinator node and a leaf node of an ad-hoc network configured according to still another embodiment of the present invention.

Narrow bandwidth (BW) part 90 radios can receive 12.5 kHz signals as low as −116 dBm. For wider BW signals the sensitivity of the received signal degrades. For example, for a 200 kHz signal BW the same receiver sensitivity will drop by at least 12 dB. The example power control plots in FIGS. 5 and 6 are based on two such scenarios. In general an RF link budget of a PAN device can vary in a broad range. Typical link budget for WPAN devices can vary from about 50 dB to about 150 dB. There are several models published in literature to estimate the average RF signal path loss, which depending on the surroundings of a network may result in a communication circumference of a few meters to several kilometers.

While IEEE 802.15.4 g terminology is primarily used herein, it is contemplated that the disclosed techniques are broadly applicable to IEEE 802.15 family of networks, as well as other wireless ad-hoc networks. For example, an ad-hoc network may be a personal area network (PAN), a home area network (HAN), a neighborhood area network (NAN), or other network (e.g., a smart utility network (SUN)). According to at least one embodiment of the present disclosure, each SUN node (device) in a SUN can reduce the amount of interference generated by maintaining transmitted output power at a minimum level needed to achieve reliable communication. According to aspects of the present disclosure, each SUN node that functions as a leaf node controls transmitted power based on a measurement of a received signal power (e.g., power of a beacon signal) from a SUN node that functions as a coordinator node.

Figure 4:
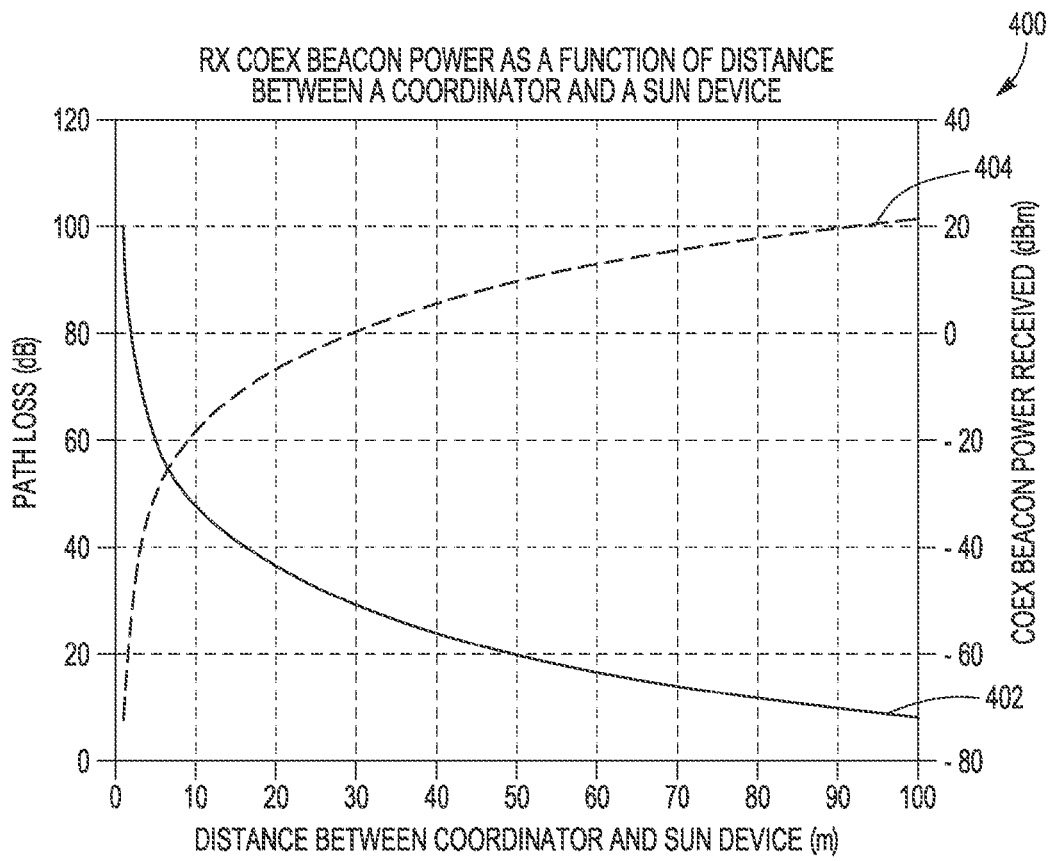
FIG. 4 is a graph depicting beacon signal power as a function of a distance between a coordinator node and a leaf node of an ad-hoc network configured according to an embodiment of the present invention.

With reference to FIG. 4, plot 400 depicts path loss 404 and received beacon signal strength 402 as a function of the distance between a coordinator node transmitting a beacon signal and a receiving leaf node or SUN device (using a model detailed in M. Hata, "Empirical Formula for Propagation Loss in Land Mobile Radio Services", IEEE Transactions on Vehicular Technology, vol. 29, pp 317-25, 1980). It should be appreciated that the Hata model, which results in relatively worst case link budget analysis, is used as an example. That is, a wide variety of models may be employed for radio frequency (RF) link budget calculations. In general, for models with milder loss per unit distance (long range communications), the benefit of implementing transmit power control according to the present disclosure is generally more pronounced.

According to various aspects of the present disclosure, a SUN device (e.g., joining leaf node 206) is configured to determine a signal strength of a beacon signal, e.g., as indicated by a received signal strength indictor (RSSI), received from a coordinator node (e.g., coordinator node 202). RSSI of the beacon signal can then be used by an automatic gain control (AGC) for a receiver to estimate a strength of the incident beacon signal (Pbeacon−Pbeacon_rx). The SUN device then performs a calculation to determine the transmit power that the SUN device should use to communicate with the coordinator node. For example, transmitter power (Ptx) may be calculated using the following formula:

$$Ptx = \max(\min(Ptx,max, (Pbeacon - Pbeacon\_rx) + Rx\_min\_sensitivity + Rx\_SNRmin), Ptx,min)$$

where Ptx,max is the maximum allowable transmit output power (dBm); Ptx,min is the minimum allowable transmit output power (dBm); Pbeacon is the transmitted power of the beacon signal; Pbeacon_rx is the transmitted power loss of the beacon signal at the receiver; Rx_min_sensitivity is the minimum receiver sensitivity; and Rx_SNRmin is the minimum signal-to-noise ratio (SNR) desired for a received signal. For example, assuming a Ptx,max of 30 dBm, a Pbeacon of 30 dBm, a Pbeacon_rx of 5 dBm, an Rx_min_sensitivity of −90 dBm, an Rx_SNRmin of 4 dBm, and a Ptx,min of −30 dBm, Ptx is equal to −30 dBm. If the transmit power is implemented with a gain step size of Ptx,step, the quantized transmit power (Ptx,quant) can be computed as:

$$Ptx,quant=round(Ptx/Ptx,step)*Ptx,step$$

where Ptx,step is the transmit power control step size (dB).

In general, the disclosed techniques reduce power consumption of a leaf node (peripheral device) in an ad-hoc wireless network while at the same time reducing interference levels generated for neighboring leaf nodes, which enables wireless ad-hoc networks to be formed with a greater number of leaf nodes. Using the disclosed techniques (and under the conditions of FIG. 4), a typical leaf node transmitter transmits at less than full power for about seventy-six percent of the time. Use of the disclosed power control mechanism can result in potential saving of about sixty-two percent of average power consumed in transmit operations by SUN devices, assuming a uniformly distributed mesh of SUN devices around a centrally located coordinator.

With reference to FIG. 5, a plot 500 illustrates transmitter power control for a distance up to 250 meters around a coordinator node using the following assumptions: Ptx,max is equal to 30 dBm; Ptx,min is equal to −30 dBm; Ptx,step is equal to 6 dB; Pbeacon is equal to 30 dBm; Rx_min_sensitivity is equal to −90 dBm; and Rx_SNRmin is equal to 4 dB. Assuming a uniformly distributed mesh of SUN devices around a centrally located coordinator node, employing the disclosed techniques can yield a savings of thirty-three percent of average power consumed in transmitter operation of SUN devices. In this case, power savings was computed using a transmit power consumption profile of the form:

$$\alpha+\beta \cdot e^{\gamma(P_{tx}-P_{tx,max})}$$

where $\alpha$ is the power consumption of a transmitter at Ptx,min; $\beta$ is the power consumption difference between Ptx,max and Ptx,min and $\gamma$ is an implementation dependant power scaling constant. Under the above conditions, a transmitter of a leaf node transmits at less than full power for seventy-six percent of the time.

With reference to FIG. 6, a plot 600 illustrates transmitter power control for a distance up to 250 meters around a coordinator node in a wireless PAN deployment using the following assumptions: Ptx,max is equal to 20 dBm; Ptx,min is equal to −22 dBm; Ptx,step is equal to 6 dB; Pbeacon is equal to 30 dBm; Rx_min_sensitivity is equal to −90 dBm; an Rx_SNRmin is equal to 4 dB. Assuming a uniformly distributed mesh of SUN devices around a centrally located coordinator node, employing the disclosed techniques can yield a savings of 16.4 percent of average power consumed in transmitter operation of SUN devices. Under the above conditions, transmitters of leaf nodes transmit at less than full power for about forty-two percent of the time. From plot 600, it should be appreciated that the benefit of the disclosed power control techniques depend on the network configuration. It should be appreciated that since PANs may reconfigure over time, transmit power of a node may potentially be tuned after each received packet (e.g., using a moving average to estimate a desired transmit power).

Figure 7:
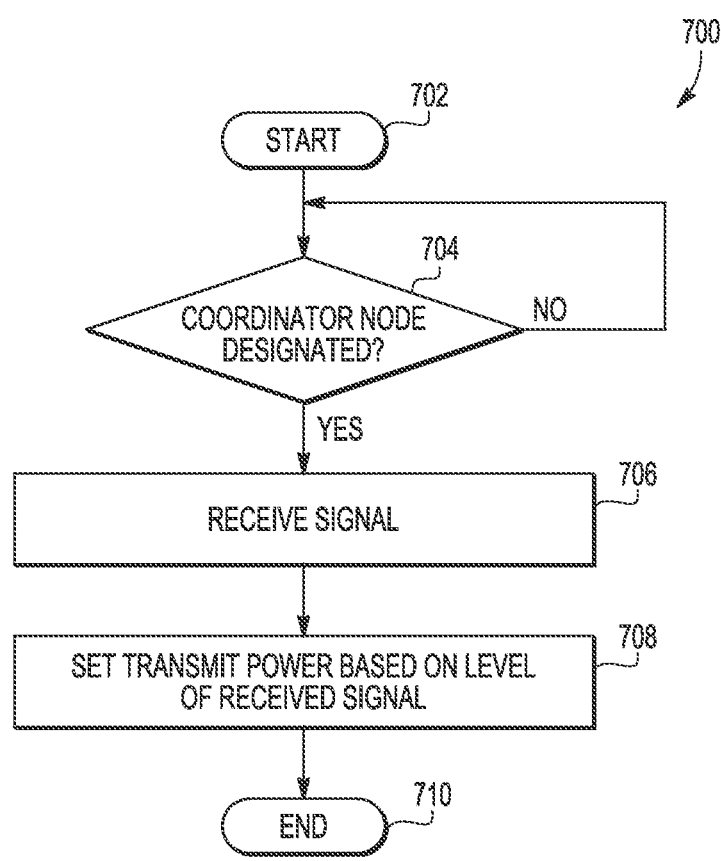
FIG. 7 is a flowchart of an example process for implementing power control techniques for leaf nodes in an ad-hoc network according to various embodiments of the present invention.

With reference to FIG. 7, a process 700 for controlling transmit power of nodes in an ad-hoc network is illustrated. Process 700 is initiated in block 702, at which point control transfers to decision block 704. In block 704, a coordinator node for the ad-hoc network is designated. For example, a first full-function device (FFD) to become operational (e.g., power-up) may be designated as a coordinator node of an ad-hoc network that later includes multiple FFDs. As another example, when an ad-hoc network only includes a single FFD, the single FFD is designated as the coordinator node and the ad-hoc network is non-functional until the single FFD is operational. As yet another example, when an ad-hoc network includes multiple FFDs, one of the FFDs may be designated as the coordinator node based on a vote by the multiple FFDs. For example, an FFD that reliably communicates with a fixed number of leaf nodes at a lowest transmitter power may be designated as the coordinator node of an ad-hoc network. It should be appreciated that a coordinator node of an ad-hoc network may change from time-to-time based on, for example, which FFD is currently capable of communicating with associated leaf nodes of the ad-hoc network at a lowest transmitter power.

Next, in block 706, a leaf node receives a signal from the designated coordinator node. For example, the signal may correspond to a beacon signal that the coordinator node broadcasts to all leaf nodes within range. Then, in block 708, the leaf node sets a transmit power of its transmitter based on (e.g., a level of) the signal received from the coordinator node. The leaf node may set its transmitter power when the leaf node joins the ad-hoc network and may periodically reset its transmitter power while the leaf node is part of the ad-hoc network. As noted above, a level of the transmit power of the transmitter may be a function of one or more of the following: a topology of the ad-hoc network, a frequency utilized by the ad-hoc network, or regulatory requirements of a region in which the ad-hoc network is located. For example, the topology of the ad-hoc network may be: a ring, a mesh, a star, a line, a tree, a bus, or a fully-connected topology. Following block 708, control transfers to block 710 where process 700 terminates.

An ad-hoc network configured according to the present disclosure may implement a carrier sense multiple access protocol or any protocol that is suitable for an ad-hoc network. It should be appreciated that the disclosed power control techniques may be advantageously employed in local centrally coordinated semi-autonomous networks, such as those employed in facility management, fleet management, custodial and security services. Moreover, the disclosed power control techniques may be advantageously employed in various other applications, e.g., medical/body area networks, peer-to-peer networks, and infrastructure management.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the techniques disclosed herein are generally broadly applicable to wired and wireless communication systems that facilitate voice communication, in addition to data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of controlling transmit power of nodes in an ad-hoc network, comprising:
    receiving, by a receiver of a leaf node included in the nodes of the ad-hoc network, a signal from a coordinator node included in the nodes of the ad-hoc network; and
    setting, by the leaf node, a transmit power of a transmitter of the leaf node based on a level of the signal and a desired minimum sensitivity for the receiver, wherein the transmit power of the transmitter of the leaf node is set using the formula Ptx=max(min(Ptx,max,(Pbeacon−Pbeacon_rx)+Rx_min_sensitivity+Rx_SNRmin),Ptx, min), where Ptx,max is the maximum allowable transmit output power (dBm), Ptx,min is the minimum allowable transmit output power (dBm), Pbeacon is the transmitted power of the beacon signal, Pbeacon_rx is the transmitted power loss of the beacon signal at the receiver, Rx_min_sensitivity is the minimum receiver sensitivity, and Rx_SNRmin is the minimum signal-to-noise ratio (SNR) desired for a received signal.

2. The method of claim 1, further comprising:
    designating one of the nodes of the ad-hoc network to act as the coordinator node.

3. The method of claim 2, wherein a first one of the nodes in the ad-hoc network that is powered-up is designated to act as the coordinator node.

4. The method of claim 1, wherein the transmit power is changed in response to adding or deleting a node from the ad-hoc network.

5. A first network node of an ad-hoc network, comprising:
    a receiver;
    a transmitter; and
    a control unit coupled to the receiver and the transmitter, wherein the control unit is configured to set a transmit power of the transmitter based on a level of a signal received by the receiver from a second network node of the ad-hoc network and a desired minimum signal-to-noise ratio for a received signal, wherein the first network node is a leaf node, the signal is a beacon signal transmitted from the second network node, and the second network node is a coordinator node, and wherein the transmit power of the transmitter of the leaf node is set using the formula Ptx=max(min(Ptx,max,(Pbeacon−Pbeacon_rx)+Rx_min_sensitivity+Rx_SNRmin),Ptx, min), where Ptx,max is the maximum allowable transmit output power (dBm), Ptx,min is the minimum allowable transmit output power (dBm), Pbeacon is the transmitted power of the beacon signal, Pbeacon_rx is the transmitted power loss of the beacon signal at the receiver, Rx_min_sensitivity is the minimum receiver sensitivity, and Rx_SNRmin is the minimum signal-to-noise ratio (SNR) desired for a received signal.

6. The first network node of claim 5, wherein the second network node is a coordinator node and a first node of the ad-hoc network to power-up is designated to act as the coordinator node.

7. The first network node of claim 5, wherein the transmit power is changed in response to adding or deleting a node from the ad-hoc network.

8. The first network node of claim 5, wherein the signal is a beacon signal.

9. A leaf node of an ad-hoc network that includes multiple nodes, the leaf node comprising:
    a receiver configured to receive a beacon signal from a coordinator node included in the multiple nodes; and
    a transmitter that is configured to transmit at a transmit power set using the formula Ptx=max(min(Ptx,max, (Pbeacon−Pbeacon_rx)+Rx_min_sensitivity+Rx_SNRmin),Ptx,min), where Ptx,max is the maximum allowable transmit output power (dBm), Ptx,min is the minimum allowable transmit output power (dBm), Pbeacon is the transmitted power of the beacon signal, Pbeacon_rx is the transmitted power loss of the beacon signal at the receiver, Rx_min_sensitivity is the minimum receiver sensitivity, and Rx_SNRmin is the minimum signal-to-noise ratio (SNR) desired for a received signal.

10. The leaf node of claim 9, wherein the transmit power is changed in response to replacing the coordinator node with another node included in the ad-hoc network.

* * * * *